United States Patent
Chavez, Jr. et al.

(10) Patent No.: US 6,192,132 B1
(45) Date of Patent: Feb. 20, 2001

(54) SHORT TERM INTERNET ACCESS

(75) Inventors: David L. Chavez, Jr.; John C. Moran, both of Thornton, CO (US)

(73) Assignee: Avaya Technology Corp., Miami Lakes, FL (US)

(*) Notice: Under 35 U.S.C. 154(b), the term of this patent shall be extended for 0 days.

(21) Appl. No.: 09/105,670

(22) Filed: Jun. 26, 1998

(51) Int. Cl.[7] .................................................. G06F 13/00
(52) U.S. Cl. ..................... 380/284; 702/229; 702/200; 702/225; 713/155; 713/182; 713/183; 713/185
(58) Field of Search ........................... 380/284; 709/229, 709/200, 225; 713/155, 182, 183, 185, 192; 705/18, 73

(56) References Cited

U.S. PATENT DOCUMENTS

| | | | |
|---|---|---|---|
| 5,737,414 | 4/1998 | Walker et al. | 380/4 |
| 5,749,075 | 5/1998 | Toader et al. | 705/14 |
| 5,764,639 | 6/1998 | Staples et al. | 370/401 |
| 5,878,143 | * 3/1999 | Moore | 380/25 |
| 5,960,084 | * 9/1999 | Angelo | 380/25 |
| 5,970,477 | * 10/1999 | Roden | 705/32 |
| 5,983,273 | * 11/1999 | White et al. | 709/229 |
| 5,987,123 | * 11/1999 | Scott et al. | 380/4 |
| 6,021,202 | * 2/2000 | Anderson et al. | 380/25 |

\* cited by examiner

Primary Examiner—Thomas R. Peeso
Assistant Examiner—Todd Jack
(74) Attorney, Agent, or Firm—John C. Moran

(57) ABSTRACT

Allowing a service vendor to establish a set of Internet access accounts with an Internet service provider and to have the capability of activating or deactivating an Internet access account by directly interacting with the Internet service provider system via a digital link. In addition, the service vendor can determine the amount of access time that has been spent on each of the Internet access accounts owned by the service vendor. The service vendor can also rent to a user an Internet terminal that can only be utilized to access the Internet access account rented to that user. In the Internet terminal, the Internet access account number is encrypted and cannot be modified by the user. In addition, the service provider has the capability of disabling the rented Internet terminal by transmission of a message via the Internet service provider system.

10 Claims, 5 Drawing Sheets

SHORT TERM INTERNET ACCESS

TECHNICAL FIELD

This invention relates to the Internet.

BACKGROUND OF THE INVENTION

The information on the Internet has increased not only in volume but in quality to the point where many people rely on these informational databases for many aspects of their life. Particularly, when people are traveling the information databases available through the Internet are important. For example, airline and hotel reservations and schedules can be easily accessed via the Internet. Another example is that detailed maps plus instructions on how to get to different locations are available on the Internet. Also, up-to-date weather information is available on the Internet. A number of services are offered via the Internet such as the ability to receive and send email thus freeing people from receiving email only on their dedicated systems. Unfortunately, when an individual is traveling it becomes difficult if not impossible to access the Internet and have the same Internet access capability that is available to the individual while at home. This may be because the individual can only access the Internet from their place of business or that their Internet service provider (ISP) only provides local service. However, even an ISP that has national coverage such as AT&T or America On Line, a problem is encountered when an individual travels outside of the United States. A business trip or vacation trip can leave an individual without access to the Internet service when the individual needs such access the greatest. It is difficult for the Internet service providers to provide service for individuals for short periods of time such as a few days. The reason for this is that the typical Internet service provider has a fairly cumbersome manner in which accounts are set up and terminated.

What is needed is a mechanism whereby service vendors such as tour services, hotels, car rental companies, etc. could offer to their customers Internet access for short periods of time.

SUMMARY OF THE INVENTION

The preceding problem is solved and a technical advance is achieved by an apparatus and method that allows a service vendor to establish a set of Internet access accounts with an Internet service provider and to have the capability of activating or deactivating an Internet access account by directly interacting with the Internet service provider system via a digital link. In addition, the service vendor can determine the amount of access time that has been spent on each of the Internet access accounts owned by the service vendor. Advantageously, the service vendor also rents to a user an Internet terminal which can only be utilized to access the Internet access account rented to that user. The Internet access account is encrypted and cannot be modified by the user. In addition, the service provider has the capability of disabling the rented Internet terminal by transmission of a message via the Internet service provider system.

These and other features and advantages of the invention will become more apparent from the following description of an illustrative embodiment of the invention considered together with the drawing.

DETAILED DESCRIPTION

Figure 1:
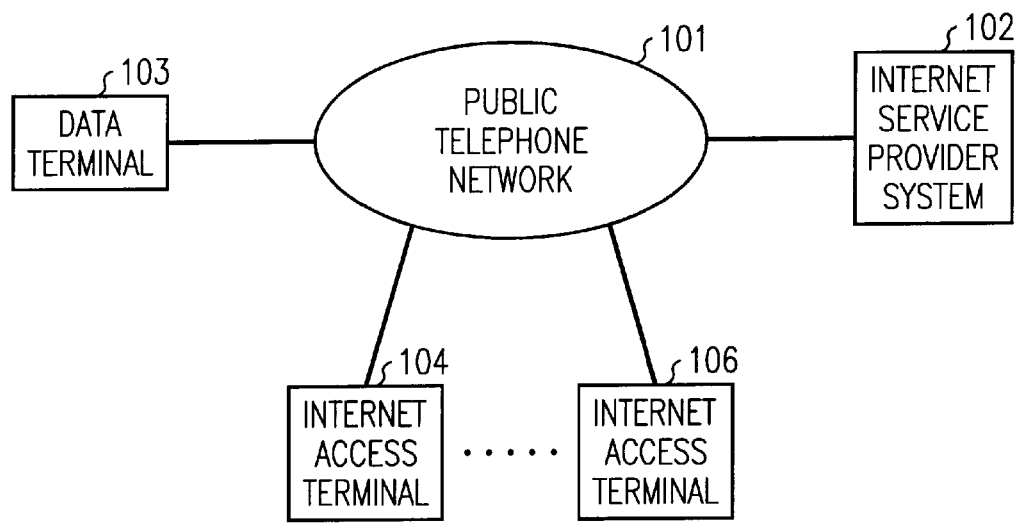
FIG. 1 illustrates a system embodying the invention.

FIG. 1 illustrates a system for implementing the invention. Internet service provider 102 provides Internet access to Internet access terminals 104–106. In addition, Internet service provider system 102 provides Internet access to terminals other than terminals 104–106. Internet access terminals 104–106 are provided access accounts on Internet service provider system 102 by a service vendor. The service vendor utilizes data terminal 103 to directly administer these access accounts. The service vendor may own an Internet access terminal and also provide the Internet access account; or the service vendor provides software that allows the user to utilize their own terminal and an access account from the service provider to access Internet service provider system 102.

FIG. 1 illustrates that Internet access terminals 104–106 access Internet service provider system 102 via public telephone network 101. One skilled in the art would readily envision other methods for the Internet access terminals to access Internet service provider system 102. The service vendor utilizes data terminal 103 to access Internet service provider system 102 to activate and deactivate access accounts which have been purchased by the service vendor on Internet service provider system 102. The administrator of Internet service provider system 102 is not directly involved with the activation and deactivation of access accounts owned by the service vendor. In addition, the service vendor can utilize data terminal 103 to obtain the service record for each of the access accounts. The service record defines the amount of usage that the access account has been used for. To perform these operations, the service vendor must identify themselves via data terminal 103 by a personal identification number (PIN) which may be a simple number, voice print, or some other mechanism of personal identification.

Figure 5:
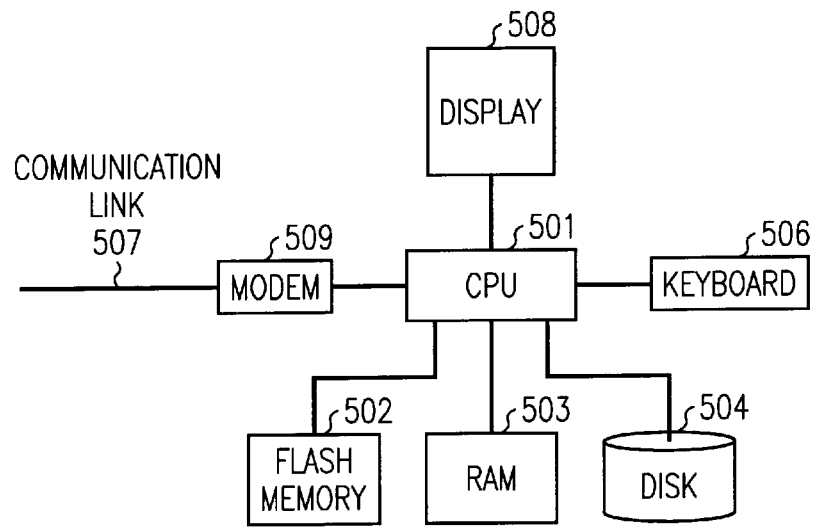
FIG. 5 illustrates, in block diagram form, a first embodiment of an Internet access terminal.

In addition to providing access accounts to users, the service vendor also provides Internet access terminals that may be rented. Such a terminal is illustrated in FIG. 5. In addition, the service vendor provides a special software package for users who have their own personal computers (PC). Both the service provider terminals and software contain the access number as an encrypted piece of data. The service vendor has the capability via Internet service provider system 102 to inhibit the user's use of the Internet service provider system 102 by inhibiting access to this encrypted access number. In addition, the service provider further has the capability of removing all software from Internet access terminals provided by the service vendor upon transmission of a message to Internet service provider system 102. Upon receipt of this message, Internet service provider system 102 sends an encrypted message to the Internet access terminal which causes the terminal to destroy all software present on the terminal. This is done so that the service vendor can render the Internet access terminal inoperable in case the user attempts to steal it. In addition, software provided by the service vendor is responsive to such an encrypted message to totally remove the software of the service vendor from the PC of the user.

Figure 2:
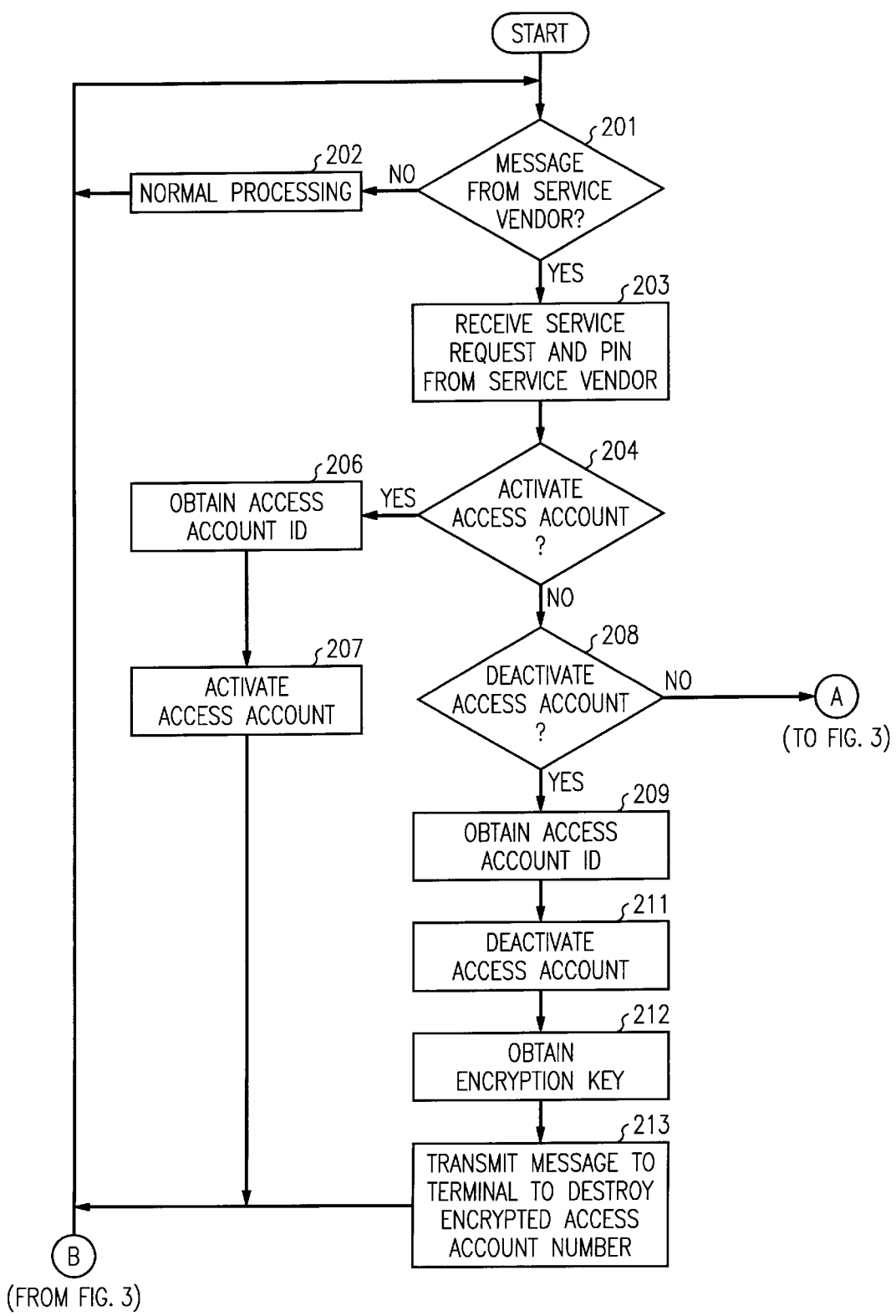
FIGS. 2 and 3 illustrate, in flow chart form, steps performed by the Internet service provider in implementing the invention.
Figure 3:
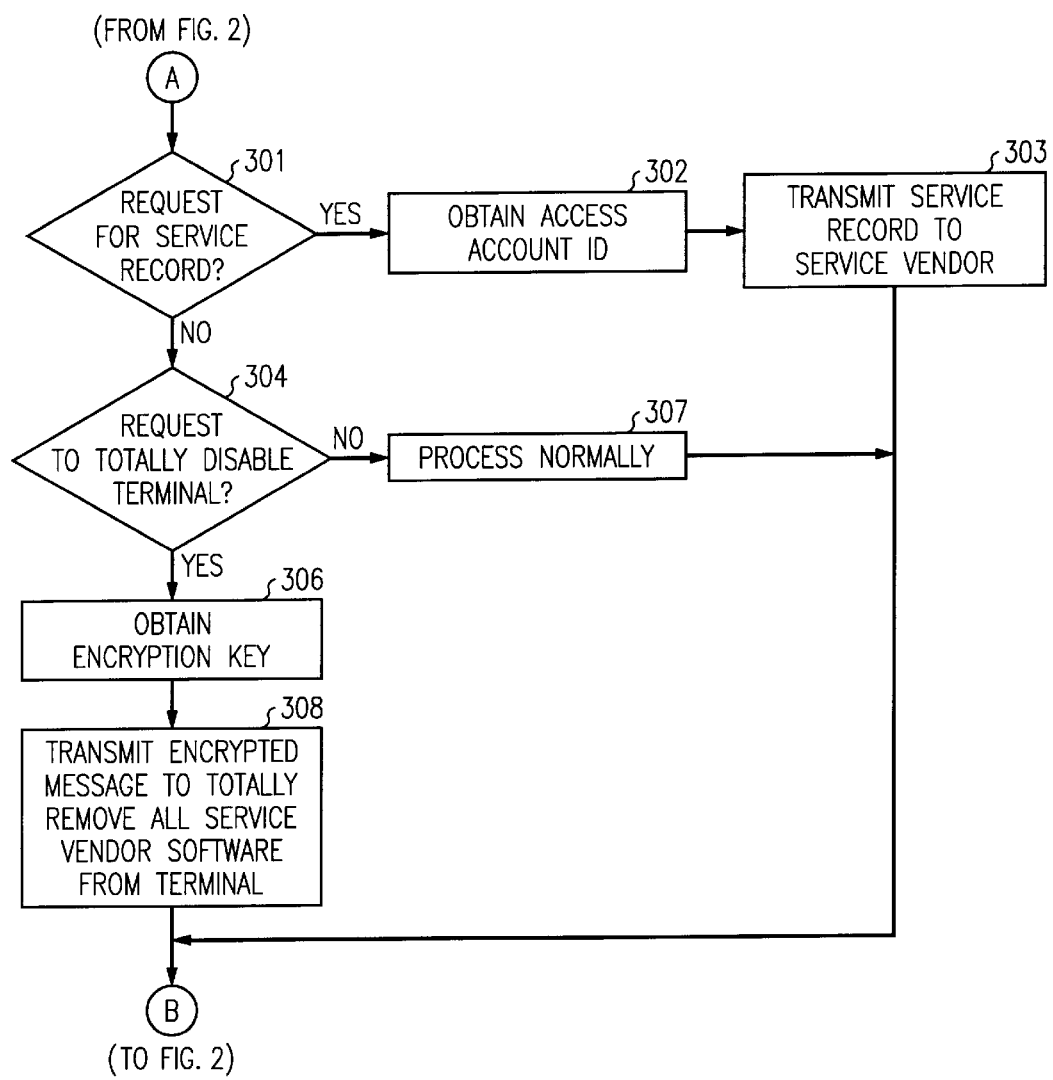

FIGS. 2 and 3 illustrate, in flow chart form, the steps performed by Internet service provider system 102 in responding to messages from the service vendor. Decision block 201 is responsive to a message or instigation of a task to determine if it is a message from the service vendor. If the answer is no, block 202 performs normal processing before returning control back to decision block 201. If the answer is yes, block 203 receives the service request and the PIN from the service vendor before transferring control to decision block 204. Decision block 204 determines if the request is to activate an access account. If the answer is yes, block 206 obtains the access account ID from the service vendor, and block 207 activates the access account before returning control back to decision block 201.

Returning to decision block 204, if the answer is no, decision block 208 determines if it is a request to deactivate an access account. If the answer is yes, block 209 obtains the access account ID, and block 211 deactivates the access account. Block 212 then requests and obtains from the service vendor the encryption key that allows access into the Internet access terminal. Block 213 then transmits a message to the terminal requesting that the terminal destroy the encrypted access account number. Note, that if the Internet access terminal is not active on Internet service provider system 102 at this time, the system will have to wait until the terminal becomes active to actually execute the action of block 213. After execution of block 213, control is transferred back to decision block 201. Internet access software provided by the service vendor running on a PC of a user will perform the same operations.

Returning to decision block 208, if the message from the service vendor is not requesting the deactivation of an access account, control is transferred to decision block 301 of FIG. 3. Decision block 301 determines if the message is requesting the service record for a particular access account. If the answer is yes, block 302 obtains the access account ID; and block 303 transmits the service record for that access account to the service vendor before transferring control back to decision block 201 of FIG. 2.

Returning to decision block 301, if the answer is no, control is transferred to decision block 304 which determines if the service vendor is requesting that the Internet access terminal be totally disabled with respect to accessing Internet service provider system 102. If the answer is no, block 307 performs normal processing before returning control back to decision block 201 of FIG. 2. If the answer is yes, block 306 obtains the encryption key from the service vendor, and block 308 transmits an encrypted message to the terminal to totally remove all service vendor software from the terminal before returning control back to decision block 201 of FIG. 2.

Figure 4:
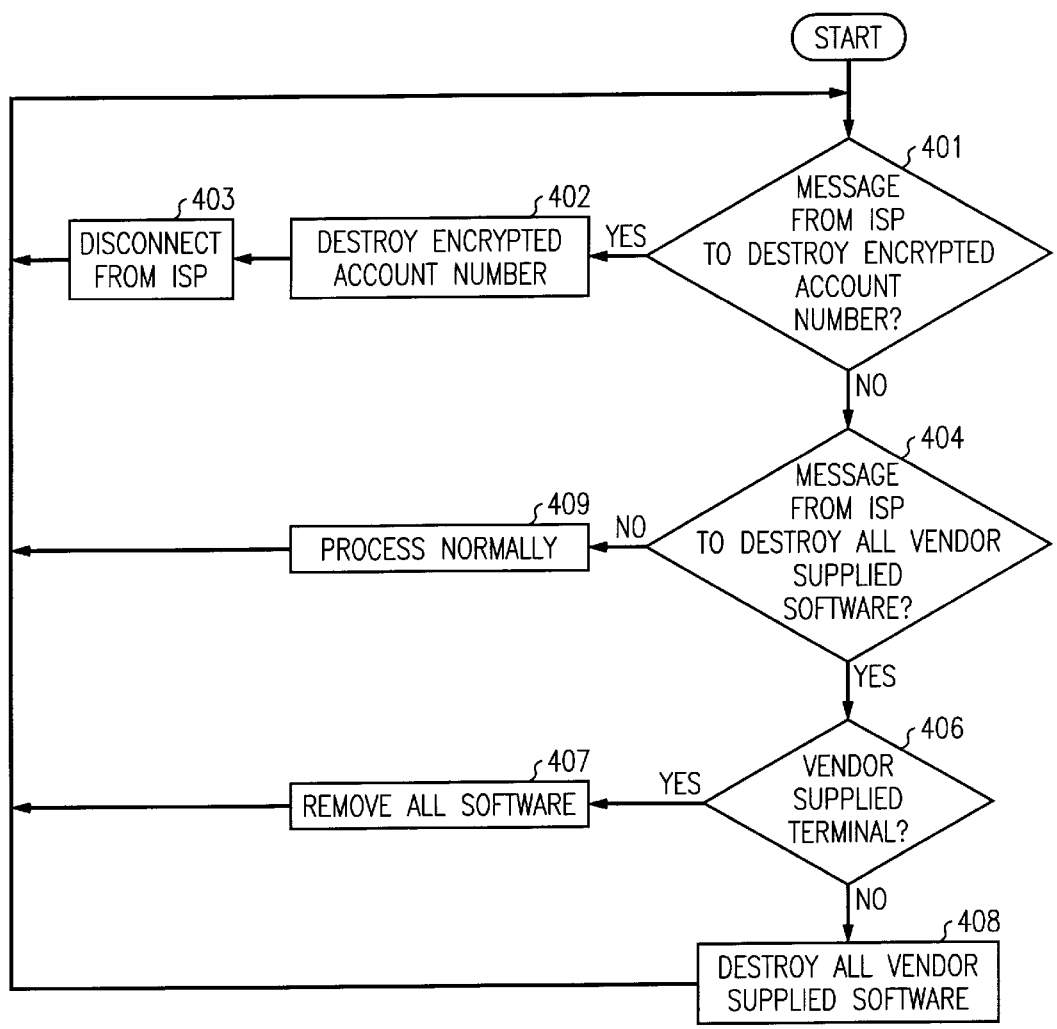
FIG. 4 illustrates, in flow chart form, steps performed by an Internet access terminal.

FIG. 4 illustrates, in flow chart form, the steps performed by a terminal. Decision block 401 determines if a message has been received from Internet service provider system 102 requesting that the encrypted account number be destroyed. Decision block 401 utilizes the encryption key in the message to make certain that the message is truly from Internet service provider system 102. If the answer is yes, block 402 destroys the encrypted account number by gaining access to that number utilizing the encryption key; and block 403 disconnects from Internet service provider system 102 before transferring control back to decision block 401.

If the answer in decision block 401 is no, decision block 404 determines if there is a message from Internet service provider system 102 to destroy all service vendor supplied software on a PC of a user or all software on an Internet access terminal. If the answer is no, block 409 performs normal processing before transferring control back to decision block 401. If the answer is yes, decision block 406 determines if the terminal is one supplied by the service vendor. If the answer is yes, block 407 removes all software from the terminal before transferring control back to decision block 401. If the answer in decision block 406 is no, block 408 destroys only the software supplied by the service vendor within the user's PC before transferring control back to decision block 401. Both block 407 and 408 are allowed to perform these operations only if they have the proper encryption key which is received from Internet service provider system 102.

FIG. 5 illustrates, in block diagram form, details of an Internet access terminal provided by the service vendor. The operation of elements 501, and 503–509 is performed in a manner well understood in the prior art for providing access to Internet service provider system 102. Flash memory 502 is utilized to contain the encrypted access account number that is needed to gain access to Internet service provider system 102. In addition, in order to remove this encrypted access account number, the software executed by CPU 501 has to obtain the encryption key from Internet service provider system 102 as was set forth in FIGS. 2 and 3. The encryption key is used to gain access to flash memory 502. Similarly, to totally remove all software from RAM 503 and disk 504 the encryption key must be received and verified by accessing flash memory 502. Only the service vendor can write the encryption key and the encrypted access account number into flash memory 502.

Figure 6:
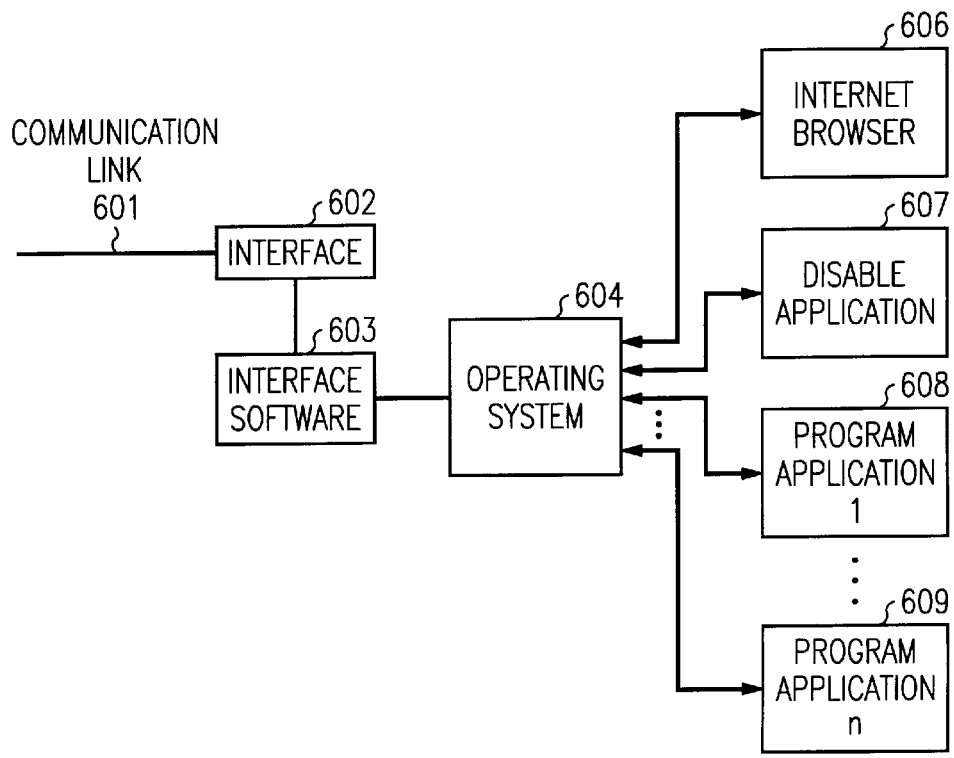
FIG. 6 illustrates, in block diagram form, a software structure in a personal computer of a user.

FIG. 6 illustrates the software structure in a PC of a user which has been loaded with service vendor software. Internet browser 606 and disable application 607 are loaded by the service vendor when the user rents an access account on Internet server provider system 102 of FIG. 2 from the service vendor. When the PC interconnects to Internet service provider system 102, Internet browser 606 and disable application 607 establish software sessions with software executing in Internet service provider system 102. Internet browser 606 may be a standard commercial browser program. The access account number is maintained by disable application 607. Disable application 607 is executing the steps illustrated in FIG. 4. When disable application 607 executes block 408 of FIG. 4, disable application 607 first removes Internet browser 606 and then removes itself from the PC of the user. Other software blocks are not effected by disable application 607. Elements 601–604 perform well known operations within the art. Program applications 608–609 are standard user applications such as word processing or database applications.

It is to be understood that the above-described embodiment is merely illustrative of the principles of the invention and that other arrangements may be devised by those skilled in the art without departing from the spirit or scope of the invention.

What is claimed is:

1. A method of providing access by a service vendor to a network data exchange facility controlled by a service provider for a plurality of data terminals, comprising the step of:

providing a plurality of access accounts owned by the service vendor;

receiving a first message via a data link from the service vendor requesting the activation of one of the plurality of access accounts;

requesting personal identification information from the service vendor to verify the identify of the service vendor;

activating the one of the plurality of access accounts in response to the first message and the personal identification information;

receiving a second message via a data link from the service vendor requesting the deactivation of the one of the plurality of access accounts;

requesting again the personal identification information from the service vendor to verify the identify of the service vendor;

deactivating the one of the plurality of access accounts in response to the second message and the personal identification information;

receiving a third message requesting disabling of an access account number that allows access to the one of the plurality of access accounts;

requesting an encryption key from the service vendor in response to the third message;

receiving the encryption key from the service vendor;

accessing one of a set of network data exchange facility access terminals using the one of the plurality of access accounts with the encryption key in response to the third message and the encryption key; and disabling the access account number within the one of the set of network data exchange facility access terminals in response to the third message and the encryption key.

2. The method of claim 1 further comprises the steps of receiving a fourth message requesting disablement of the one of the set of network data exchange facility access terminals;

requesting an encryption key from the service vendor in response to the fourth message;

receiving the encryption key from the service vendor;

accessing the one of a set of network data exchange facility access terminals with the encryption key in response to the fourth message and the encryption key; and disabling the one of the set of network data exchange facility access terminals in response to the fourth message and the encryption key.

3. A method of providing access by a service vendor to a network data exchange facility controlled by a service provider for a plurality of data terminals, comprising the step of:

providing a plurality of access accounts owned by the service vendor;

receiving a first message via a data link from the service vendor requesting the activation of one of the plurality of access accounts;

requesting personal identification information from the service vendor to verify the identify of the service vendor;

activating the one of the plurality of access accounts in response to the first message and the personal identification information;

receiving a second message via a data link from the service vendor requesting the deactivation of the one of the plurality of access accounts;

requesting again the personal identification information from the service vendor to verify the identify of the service vendor;

deactivating the one of the plurality of access accounts in response to the second message and the personal identification information;

receiving a third message requesting disabling of an access account number that allows access to the one of the plurality of access accounts by a user computer executing network data exchange facility access software supplied by the service vendor;

requesting an encryption key from the service vendor in response to the third message;

receiving the encryption key from the service vendor;

accessing the user computer executing network data exchange facility access software supplied by the service vendor using the one of the plurality of access accounts with the encryption key in response to the third message and the encryption key; and disabling the access account number within the user computer executing network data exchange facility access software supplied by the service vendor in response to the third message and the encryption key.

4. The method of claim 3 further comprises the steps of receiving a fourth message requesting disablement of the user computer executing network data exchange facility access software supplied by the service vendor;

requesting an encryption key from the service vendor in response to the fourth message;

receiving the encryption key from the service vendor;

accessing the user computer executing network data exchange facility access software supplied by the service vendor with the encryption key in response to the fourth message and the encryption key; and disabling the user computer executing network data exchange facility access software supplied by the service vendor in response to the fourth message and the encryption key.

5. An apparatus that performs the method of claim 1.

6. An apparatus that performs the method of claim 2.

7. An apparatus that performs the method of claim 3.

8. An apparatus that performs the method of claim 4.

9. An apparatus within a terminal for disabling the terminal from accessing a network data exchange facility, comprising:

a first application for accessing the network data exchange facility using a network data exchange facility access number, a second application for maintaining a signaling link with the network data exchange facility, the second application responsive to a first message and an encryption key received from the network data exchange facility via the signaling link for removing the network data exchange facility access number from the terminal whereby the first application can no longer access the network data exchange facility; and the second application further responsive to a second message and the encryption key for removing the first and second applications from the terminal.

10. The apparatus of claim 9 wherein the second application further responsive to the second message and the encryption key for removing all other software applications from the terminal.

* * * * *